United States Patent
Shankar et al.

(10) Patent No.: US 10,169,348 B2
(45) Date of Patent: Jan. 1, 2019

(54) USING A FILE PATH TO DETERMINE FILE LOCALITY FOR APPLICATIONS

(75) Inventors: Venky Shankar, Bangalore (IN); Vijay Bellur, Bangalore (IN)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 13/592,673

(22) Filed: Aug. 23, 2012

(65) Prior Publication Data

US 2014/0059094 A1 Feb. 27, 2014

(51) Int. Cl.
*G06F 17/30* (2006.01)
(52) U.S. Cl.
CPC .............................. *G06F 17/30091* (2013.01)
(58) Field of Classification Search
CPC ................................................ G06F 17/30132
USPC ................ 707/737, 10, 100; 718/1; 719/238
See application file for complete search history.

(56) References Cited

U.S. PATENT DOCUMENTS

| 6,011,758 | A  | * | 1/2000  | Dockes et al. | |
|---|---|---|---|---|---|
| 7,499,905 | B2 | * | 3/2009  | Jaschek et al. | |
| 8,315,996 | B2 | * | 11/2012 | McClements | G06F 9/44505 |
|   |    |   |         |              | 707/695 |
| 9,043,567 | B1 | * | 5/2015  | Modukuri | G06F 3/0665 |
|   |    |   |         |          | 711/162 |
| 2002/0147706 | A1 | * | 10/2002 | Burnett | 707/3 |
| 2003/0140051 | A1 | * | 7/2003  | Fujiwara | H04L 67/1097 |
| 2003/0225796 | A1 | * | 12/2003 | Matsubara | H04L 63/101 |
| 2004/0024808 | A1 | * | 2/2004  | Taguchi | H04L 67/1095 |
|   |    |   |         |         | 709/203 |
| 2008/0027946 | A1 | * | 1/2008  | Fitzgerald | 707/10 |
| 2008/0183824 | A1 | * | 7/2008  | Chen | G06Q 10/107 |
|   |    |   |         |      | 709/206 |
| 2008/0270461 | A1 | * | 10/2008 | Gordon | G06F 3/0608 |
| 2009/0235283 | A1 | * | 9/2009  | Kim et al. | 719/328 |
| 2010/0241656 | A1 | * | 9/2010  | Iwasaki | G06F 3/0614 |
|   |    |   |         |         | 707/769 |
| 2011/0154350 | A1 | * | 6/2011  | Doyle | G06F 9/5044 |
|   |    |   |         |       | 718/104 |
| 2013/0290953 | A1 | * | 10/2013 | Li et al. | 718/1 |
| 2013/0304737 | A1 | * | 11/2013 | Joukov et al. | 707/737 |
| 2013/0332612 | A1 | * | 12/2013 | Cai | G06F 9/5066 |
|   |    |   |         |     | 709/226 |

OTHER PUBLICATIONS

Webopedia: Mount Device Definition.*

* cited by examiner

*Primary Examiner* — Etienne P Leroux
(74) *Attorney, Agent, or Firm* — Lowenstein Sandler LLP (57) ABSTRACT

A processing device identifies a path name of a file that is stored in a file system and sends an extended attribute request comprising the path name to a server computer system to identify a physical location of the file in the file system. The file system includes a virtual extended attributes that identify the physical location of the file that corresponds to the path name in the request. The processing device receives a response from the server computer system indicating the physical location of the file in the file system.

15 Claims, 5 Drawing Sheets

USING A FILE PATH TO DETERMINE FILE LOCALITY FOR APPLICATIONS

TECHNICAL FIELD

The present disclosure relates to file locality for applications, and more particularly, to making use of a file path to determine file locality for applications.

BACKGROUND

Map/reduce is a programming model for processing large data sets. Typically, map/reduce is used on clusters of computers, such as clusters of storage servers in a distributed file system. To reduce network traffic, a map/reduce-based application can determine the physical location of a file and have the storage servers, which are closest to the file, process the file for a job. For example, a file system may have clusters of storage servers, that each include a master node and one or more worker nodes. During the "map" phase, a master node can receive a job request, from the map/reduce-based application, to perform an operation using a file. The master node can divide the job into smaller sub-jobs, and can distribute the sub-jobs to the worker nodes that are closest to the file. The worker nodes can process the sub-jobs in parallel and can pass the result back to the master node. During the "reduce" phase, the master node can collect the results for the sub-jobs and combine the results to form the output for the job request. The job request may have included a location identifier of the physical location of the file that should be processed for the requested job. Traditionally, a map/reduce-based application can query a centralized metadata server which would provide the physical location of the input file to the map/reduce-based application. At times, a centralized metadata server may be a bottleneck and may be single point of failure.

BRIEF DESCRIPTION OF THE DRAWINGS

The present disclosure will be understood more fully from the detailed description given below and from the accompanying drawings of various implementations of the disclosure.

DETAILED DESCRIPTION

Described herein are a method and apparatus for identifying a physical location of a file without using a metadata server by using extended attributes in a file system. The file system can have extended attributes that include data identifying the physical location of the corresponding file. The extended attributes can be virtual extended attributes. For example, the virtual extended attribute can include a host name and may also include a directory name. A hostname may be a human-readable label that is assigned, for example, by a system administrator, to a physical device (e.g., hard disk-1, hard disk-2) that is connected to the network. For example, hard disk-1 may be assigned a host name "alpha" and hard disk-2 may be assigned a host name "beta." The hostname can be used by networking programs, storage servers, and applications (e.g., map/reduce-based applications) to identify a machine for operations. As opposed to a host name, a path name can specify a logical location, rather than a physical location, of a file in the file system. The path name can include directories and a file name to represent the directory/file relationships in the file system. For example, the path name for a file "annual-gross-sales.txt" may be "/financials/sales/annual-gross-sales.txt," which can represent the logical location of the file "annual-gross-sales.txt" in the file system.

An application, such as a map/reduce-based application, can include a physical location of a file in a job request to allow a master storage server to assign the job and/or sub-jobs to worker storage servers that may be physically closest to the physical location of the file. Traditionally, a map/reduce-based application can query a centralized metadata server, which is a single point of failure, which would provide the physical location of the file to the map/reduce-based application. Implementations of the present disclosure can store the metadata, which identifies the physical location of a file, in an extended attribute (e.g., virtual extended attribute) in the file system. Implementations of the present disclosure can query the file system to obtain the data describing the physical location of the file from the virtual extended attribute.

Implementations can include a physical location client module, which is described in greater detail below, hosted on a client machine and a physical location server module, which is described in greater detail below, hosted on a storage server machine to identify the physical location of a file without a metadata server by using extended attributes (e.g., virtual extended attributes) in the file system.

The physical location client module can receive a request from a map/reduce-based application. The request may be for the physical location client module to provide data to the map/reduce-based application that identifies the physical location of a file in a file system. The physical location client module can identify a path name, that identifies the logical location of the file in the file system, from the request of the map/reduce-based application. The physical location client module can convert the request into an extended attribute request (e.g., extended attribute system call) using a file system library and the path name in the request from the map/reduce-based application. The physical location client module can mount the file system and send the extended attribute system call to a storage server machine in the file system.

The physical location server module hosted on the storage server machine can receive the extended attribute request (e.g., extended attribute system call) and can perform a distribution algorithm (e.g., consistent hash algorithm) on the path name in the extended attribute request to determine a key. The physical location server module can use the key to generate the value of the virtual extended attribute that identifies the physical location (e.g., host name, directory name) of the file. The physical location server module can send a response, that includes a host name and may also include a directory name, to the physical location client module on the client. The physical location client module can receive the response and can use the host name and the directory name to create a job request. The physical location client module can send the job request to a master storage server.

Figure 1:
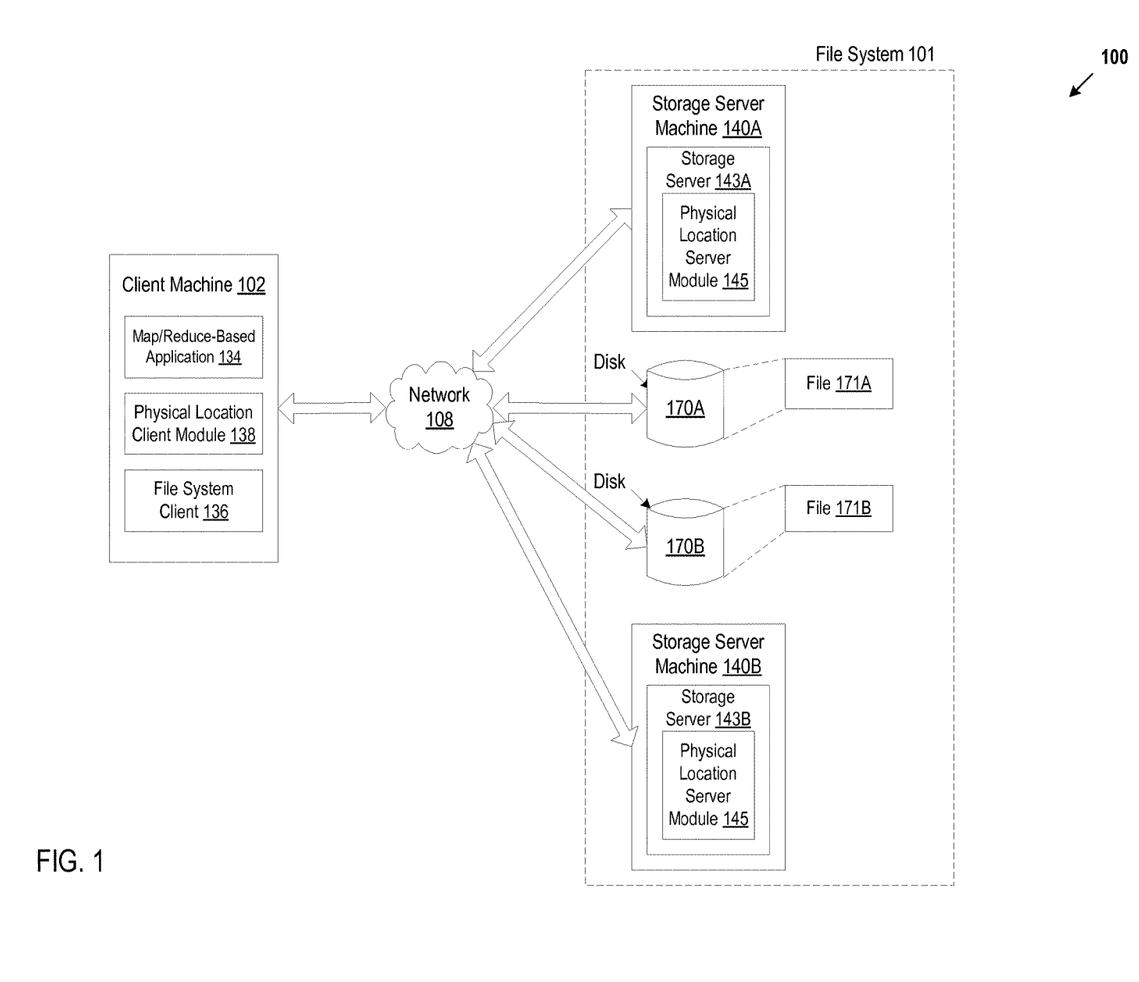
FIG. 1 illustrates an example system architecture, in accordance with various implementations.

FIG. 1 is an example system architecture 100 for various implementations. The system architecture 100 can include a distributed file system 101 coupled to one or more client machines 102 via a network 108. The network 108 may be a public network, a private network, or a combination thereof. Network 108 can include a wireless infrastructure. The wireless infrastructure may be provided by one or multiple wireless communications systems, such as a wireless fidelity (WiFi) hotspot connected with the network 108 and/or a wireless carrier system that can be implemented using various data processing equipment, communication towers, etc.

The distributed file system 101 can be a network attached storage file system that includes one or more storage server machines 140A-B and any number of mass storage devices, such as magnetic or optical storage based disks 170A-B, solid-state drives (SSDs) or hard drives, coupled to the storage server machines 140A-B via the network 108. A storage server machine 140A-B can include a network-accessible server-based functionality (e.g., storage server 143A-B) or other data processing equipment. The storage server machines 140A-B can include, and are not limited to, any data processing device, such as a desktop computer, a laptop computer, a mainframe computer, a personal digital assistant, a server computer, a handheld device or any other device configured to process data.

The distributed file system 101 can organize data (e.g., data files 171A-B) in the disks 170A-B using volumes. A volume is a single accessible storage area of the file system 101, which can be resident on a single partition of a hard disk (e.g., disks 170A-B) of the file system 101. A volume can be a representation of a logical location, rather than a physical location, of a storage area in the file system 101. For example, physical hard disk-1 may have two partitions, partition-1 and partition-2. A volume label "C:" may be assigned to partition-1 and a volume label "D:" may be assigned to partition-2. Hard disk-1 is a physical disk and "C:" and "D:" are volumes representing logical locations on physical hard disk-1.

The distributed file system 101 can store data as files 171A-B and can include directories, also referred to as folders, which are virtual containers within the file system 101, in which groups of computer files 171A-B and possibly other directories can be kept and organized. Related files 171A-B can be stored in the same directory. A sub-directory, also referred to as a sub-folder, is a directory contained inside another directory. The top-most directory is referred to as a root or top-level directory within the file system 101. Together, the directories form a hierarchy, or tree structure of one or more levels in the file system 101.

A path name can specify a logical location, rather than a physical location, of a file 171A-B in the file system 101. The path name can be used to represent the directory/file relationships in the file system 101. The path name can point to a logical location in the file system 101 using a directory tree hierarchy that may be expressed in a string of characters. The path name components can be separated by a delimiting character, such as a slash ("/"), to represent directories in the file system 101. For example, the file system may store a file 171A named "annual-gross-sales.txt" in a volume labeled "confidential_data," a top-level directory named "financials," and a sub-directory named "sales." The path name for the file 171A may be "/financials/sales/annual-gross-sales.txt," which can represent the logical location of the file 171A "annual-gross-sales.txt" in the file system 101.

A hostname may be a label that is assigned, for example, by a system administrator, to a physical device (e.g., hard disk-1, hard disk-2) that is connected to the network 108. The hostname can be a human-readable name that corresponds to an address (e.g., Internet Protocol address) that is assigned to a physical device. For example, hard disk-1 may be assigned the hostname "alpha" and hard disk-1 may be assigned the hostname "beta." The hostname can be used by networking programs, storage servers 143A-B, and applications (e.g., map/reduce-based application 134) to identify a machine for an operation.

The client machine 102 can include a file system client 136 to communicate with storage servers 143A-B in the file system 101. The client machine 102 may a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like.

The client machine 102 can host an application. An application can be any type of application including, for example, a web application, a desktop application, a browser application, etc. In one implementation, the application is a map/reduce-based application 134. Map/reduce is a programming model for processing large data sets. For example, the file system 101 may include any number of storage servers 143A-B which a map/reduce-based application 134 may work with. Map/reduce may be used on clusters of computers, such as clusters (groups) of storage server machines 140A-B in the distributed file system 101. Map/reduce can take advantage of locality of the files 171A-B in the file system 101 by processing the file 171A-B on or near the storage assets to decrease transmission of data. For example, the file system 101 can group storage servers 143A-B into clusters. Each cluster can include a master node (master storage server) and one or more worker nodes (worker storage servers). During the "map" phase, a master node can receive, for example, from the map/reduce-based application 134, a job request to perform an operation using data that is stored in the file system 101. The master node can divide the job into smaller sub-jobs, and can distribute the sub-jobs to worker nodes. A worker node may divide the sub-job into smaller jobs, leading to a multi-level tree structure. The worker nodes can process the sub-jobs in parallel and can pass the result back to the master node. During the "reduce" phase, the master node can collect the results for the sub-jobs and combine the results to form the output for the job request.

To reduce network traffic, the map/reduce-based application 134 can determine which storage servers 143A-B are closest to the data (e.g., files 171A-B) that is to be processed for a job. When the map/reduce-based application 134 submits a job request to a master node, the map/reduce-based application 134 can include a location identifier that identifies the physical location of the input data that should be processed for the requested job in the job request. The map/reduce-based application 134 can use a physical location client module 138, hosted on the client machine 102, to determine the physical location, in the file system 101, of the input data (e.g., files 171A-B) that should be processed for the requested job and can include the location identifier of the physical location of the data (e.g., files 171A-B) in the job request accordingly.

The file system 101 can store extended attributes that describe the physical location of the files 171A-B, such as a host identifier (e.g. host name). The extended attributes can be virtual extended attributes. The virtual extended attribute can also include a directory identifier (e.g., directory name). The physical location client module 138 can send a request to a physical location server module 145 hosted by a storage server 143A-B to request the physical location of the a file 171A-B. The request can be an extended attribute system call made via a mount-point. The extended attribute system call can include a path name of a file. One implementation of sending an extended attribute system call to identify the physical location of a file is described in greater detail below in conjunction with FIG. 3.

The storage server 143A-B can include a physical location server module 145 to receive the request (e.g., extended attribute system call) from the physical location client module 138 and can perform a distribution algorithm (e.g., consistent hash algorithm) on the path name in the request to determine a key. The extended attributes can be virtual extended attributes. The physical location server module 145 can use the key to query the virtual extended attributes to determine the physical location of the file 171A-B and send a response to the physical location client module 138 indicating the physical location of the file. The file system 101 can be a key-value based storage system and can store and distribute data (e.g., files) based on a distribution algorithm (e.g., a consistent hash function). Each storage server 143A-B can use the distribution algorithm to allow key look up. The keys can be used to query the virtual extended attributes. One implementation of providing the physical location of a file using an extended attribute is described in greater detail below in conjunction with FIG. 4. The physical location client module 138 can provide the physical location of the file 171A-B to the map/reduce-based application 134 and the map/reduce-based application 134 can create a job request using the physical location of the file 171A-B.

Figure 2:
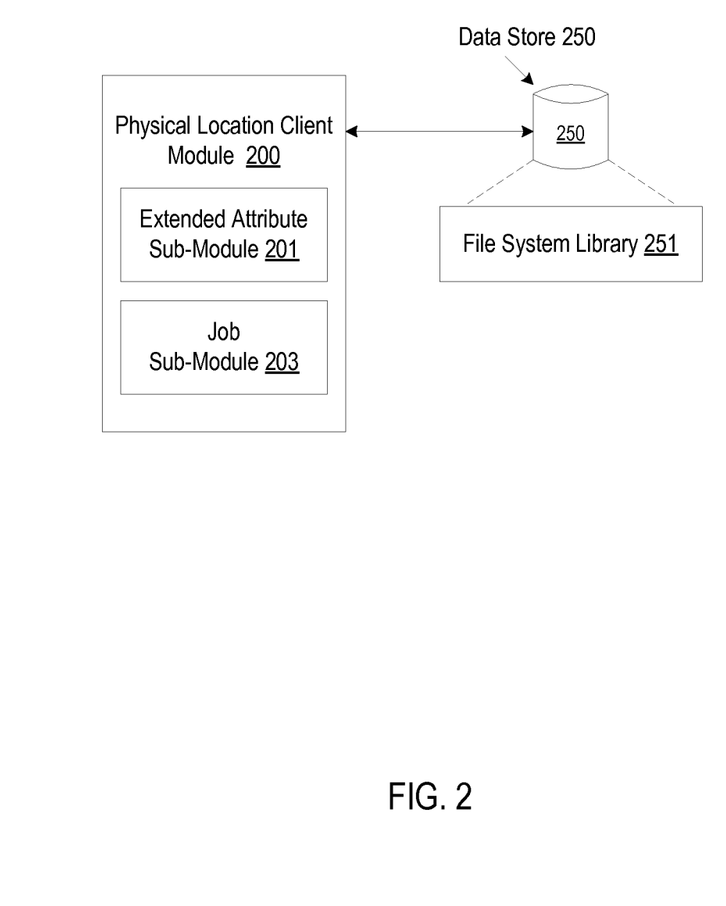
FIG. 2 is a block diagram of an implementation of a physical location client module.

FIG. 2 illustrates a block diagram of one implementation of a physical location client module 200. The physical location client module 200 may correspond to a physical location client 138 in a client machine 138 of FIG. 1. The physical location client module 200 can include an extended attribute sub-module 201 and a job sub-module 203. Note that in alternative implementations, the functionality of one or more of the sub-modules can be combined or divided.

The extended attribute sub-module 201 can receive a request to identify the physical location of a file from an application, such as, and not limited to, a map/reduce-based application. The request can include a path name and a volume identifier for the file. The extended attribute sub-module 201 can convert the request to an extended attribute request (e.g., extended attribute system call) that includes the path name for the file and can send the extended attribute request to a storage server in the file system, to identify the physical location of the file.

The extended attribute sub-module 201 can use a file system library 251 that is stored in a data store 250 that is coupled to the physical location client module 200 to convert the request to an extended attribute request. The file system library 251 can include a native file system library to provide wrappers to requests (e.g., calls) made by an application (e.g., map/reduce-based application). For example, the map/reduce-based application may make a system call and the extended attribute sub-module 201 can use wrappers provided by the file system library 251 to convert the map/reduce-based application call into a POSIX (Portable Operating System Interface) file system call. Examples of calls that may be made by the map/reduce-based application can include, and are not limited to, read, write open, close, etc. The file system library 251 can include executable routines which can be invoked by the wrappers to interface with the file system.

The extended attribute sub-module 201 can mount the file system using the volume identifier and the path name for the file from the request from the map/reduce-based application. The extended attribute sub-module 201 can send POSIX extended attribute system call to a storage server in the file system via the mount-point. The extended attribute sub-module 201 can receive a response from the storage server that indicates the physical location of the file in the file system. The response can include the host identifier (e.g., host name) and may include a directory identifier (e.g., directory name).

The job sub-module 203 can insert the data (e.g., host name, directory name) identifying the physical location of the file in a job request and can send the job request to, for example, a master storage server.

The data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 3:
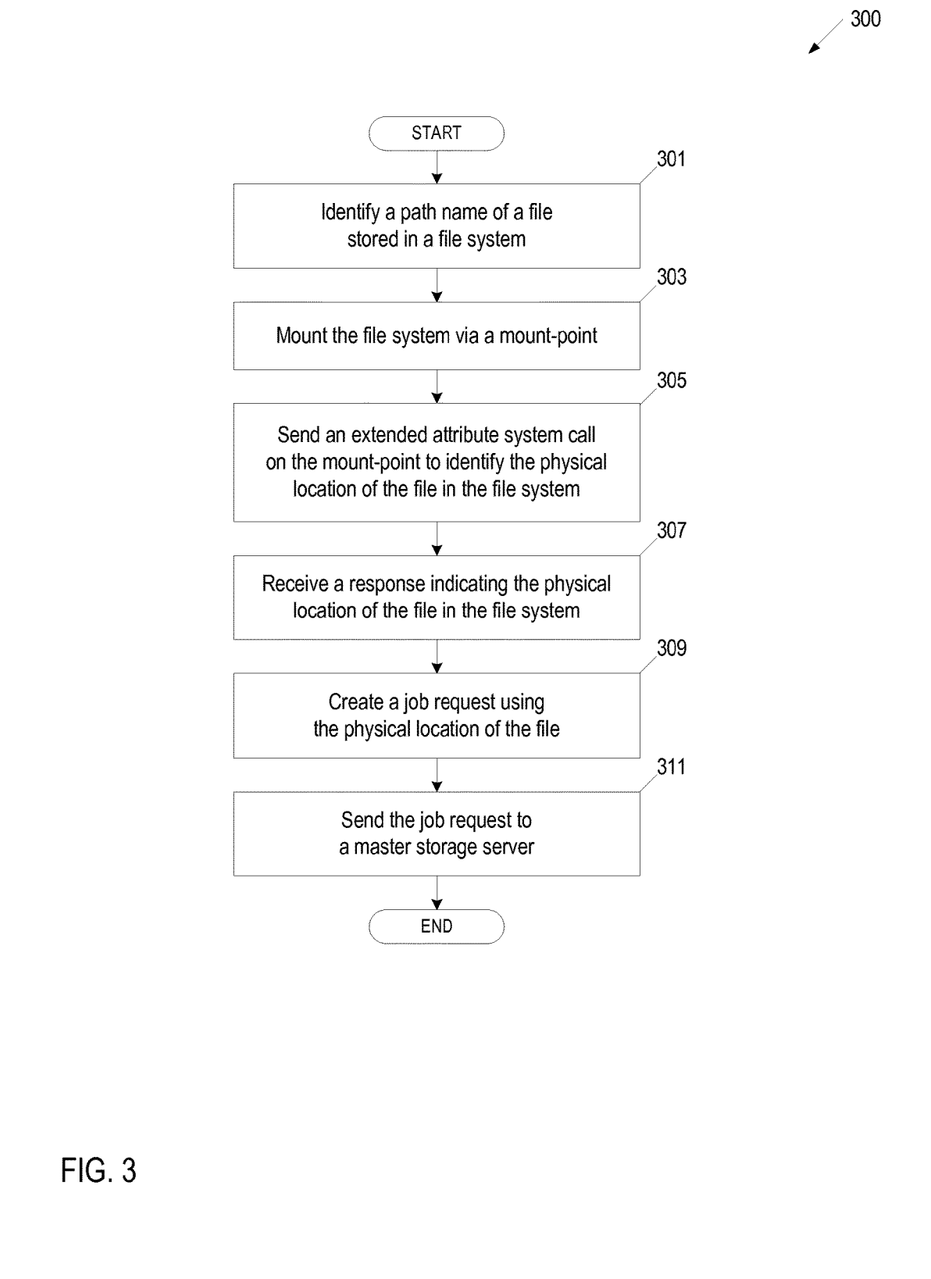
FIG. 3 is a flow diagram illustrating an implementation for a method for identifying a physical location of a file using virtual extended attributes in a file system.

FIG. 3 is a flow diagram of an implementation of a method 300 of identifying a physical location of a file using a virtual extended attribute in a file system. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by a physical location client module 138 in a client machine 130 of FIG. 1.

At block 301, processing logic identifies a path name of a file stored in a file system. Processing logic may identify a path name from a request received from an application, for example, a map/reduce-based application, to identify the physical location of the file that corresponds to the path name. The request from the application can include a volume identifier for the file. At block 303, processing logic mounts the file system via a mount-point. Processing logic can mount the file system using the volume identifier (e.g., volume label) and the path name from the request from the map/reduce-based application. Processing logic can specify the volume identifier and path name in a mount command to describe the mount point. For example, processing logic can mount the file system by specifying the volume identifier (e.g., confidential_data) and path name (e.g., /financials/sales/annual-gross-sales.txt) in a mount command.

At block 305, processing logic can create and send an extended attribute system call on the mount-point to a storage server in the file system to identify the physical location of the file in the file system. Processing logic can use a file system library that is stored in a data store that is coupled to the physical location client module to convert the request from the map/reduce-based application to an extended attribute request (e.g., extended attribute system call). For example, processing logic may send "getfattr –n trusted.samplefs.pathinfo <pathname>" command to a storage server in the file system. <pathname> may include, for example, "/financials/sales/annual-gross-sales.txt".

At block 307, processing logic receives a response indicating the physical location of the file in the file system from the storage server. The response can include a host identifier (e.g., host name) and may also include a directory identifier (e.g., directory name) for the file. At block 309, processing logic creates a job request using the physical location (e.g., host name, directory name) of the file and sends the job request to a master storage server at block 311. In one implementation, processing logic provide the host name and may also provide the directory name to a map/reduce-based application and the map/reduce-based application can create the job request using the physical location (e.g., host name, directory name) of the file and can send the job request to a master storage server.

Figure 4:
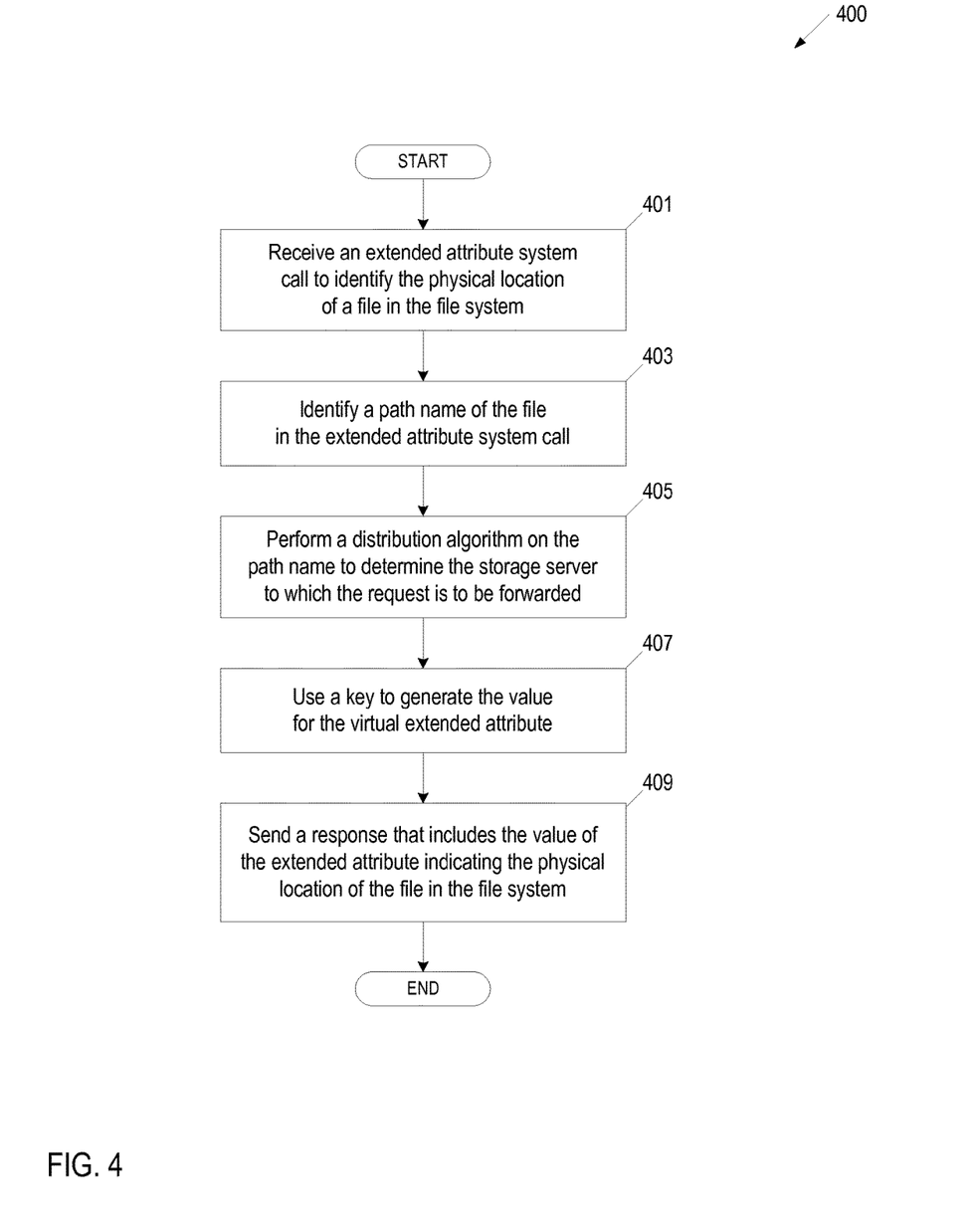
FIG. 4 is a flow diagram illustrating an implementation for a method for providing the physical location of a file using virtual extended attributes in a file system.

FIG. 4 is a flow diagram of an implementation of a method 400 of providing the physical location of a file using a virtual extended attribute in a file system. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by a physical location server module 145 in a storage server machine 140A-B of FIG. 1.

At block 401, processing logic receives an extended attribute request (e.g., extended attribute system call) to identify the physical location of a file in the file system. At block 403, processing logic identifies a path name of the file in the extended attribute system call and performs a distribution algorithm (e.g., consistent hash function), if needed, using the path name at block 405. Processing logic can run the path name through a hashing algorithm to create a hash result, which can be a numerical result. Processing logic can use the hash result to identify which storage server to which the extended attribute request should be forwarded to. Processing logic can use data that correlates storage servers to hash values to identify the appropriate storage server. Processing logic can forward the request to the identified storage server. The hash result can be used as a key. At block 407, processing logic uses the key (e.g., hash result) to generate a value of the virtual extended attribute. An extended attribute is key-value pair. The virtual extended attribute describes the physical location of the corresponding file in the file system. At block 409, processing logic sends a response that includes the value of the extended attribute that indicates the physical location of the file. The response can include a host identifier (e.g. host name) and can also include a directory identifier (e.g., directory name).

Figure 5:
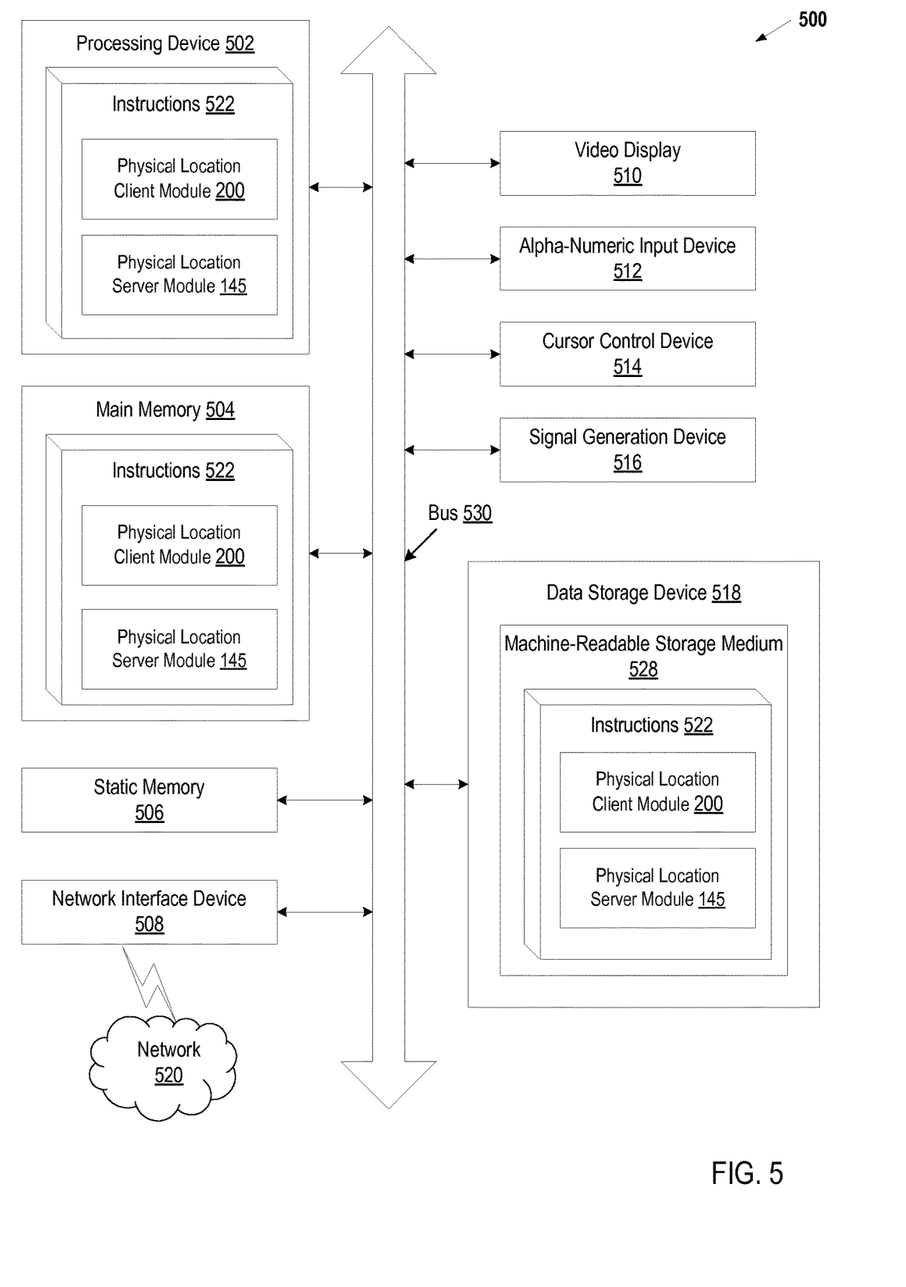
FIG. 5 is a block diagram of an example computer system that may perform one or more of the operations described herein.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for a physical location client module and/or a physical location server module (e.g., physical location client module 200 of FIG. 2, physical location server module 145 of FIG. 1) and/or a software library containing methods that call modules in a physical location client module and/or a physical location server module. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "sending" or "receiving" or "mounting" or "creating" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
identifying a path name and a volume identifier of a file that is stored in a file system associated with a plurality of storage servers, the file being associated with a system call from a map/reduce-based application;
mounting the file system via a mount-point by using the volume identifier;
determining an extended attribute request by converting the system call from the map/reduce-based application to an executable routine to be used by the file system;
sending, by a processing device, the extended attribute request to the mount-point, the extended attribute request comprising the path name to a server computer system to identify a physical location of the file at a storage server of the plurality of storage servers in the file system, wherein the file system comprises a virtual extended attribute that identifies the physical location of the file in view of a hash value associated with the path name in the request;
receiving a response from the server computer system indicating the physical location of the file at the storage server in the file system in view of the hash value associated with the path name in the request, the received response comprising a directory name that is associated with the physical location of the file in the file system;
creating a job request for the file in view of a closeness of the physical location of the file in the file system from the received response to a physical location of another storage server to operate on the file at the storage server in the file system in view of the job request; and
sending the job request to a master storage server to combine results of an operation on the file with additional results associated with an additional job request.

2. The method of claim 1, wherein identifying the path name comprises:
receiving the path name from the map/reduce-based application.

3. The method of claim 1, wherein the response comprises a host identifier or a directory identifier.

4. The method of claim 1, wherein file comprises an extended attribute indicating the physical location of the file in the file system.

5. The method of claim 1, wherein the mounting of the file system via the mount point is further in view of the path name of the file that is stored in the file system.

6. A method comprising:
identifying a system call associated with a file from a map/reduce-based application;
receiving an extended attribute request from a client computer device, wherein the extended attribute request indicates a path name and a volume identifier of a file in a file system associated with a plurality of storage servers, the extended attribute request being in view of a conversion of the system call from the map/reduce-based application to an executable routine to be used by the file system;

mounting the file system via a mount-point by using the volume identifier;
determining a key using the path name;
generating, by a processing device, a value of a virtual extended attribute using the key and the mount-point, wherein the value of the virtual extended attribute indicates a physical location of the file at a storage server of the plurality of storage servers in the file system that is identified in view of a hash value associated with the path name;
sending a response indicating the physical location of the file at the storage server to the client computer device in view of the hash value associated with the path name, the response comprising a directory name that is associated with the physical location of the file in the file system;
creating a job request for the file in view of a closeness of the physical location of the file in the file system from the received response to a physical location of another storage server to operate on the file at the storage server in the file system in view of the job request; and
sending the job request to a master storage server to combine results of an operation on the file with additional results associated with an additional job request.

7. The method of claim 1, wherein the response comprises a host identifier or a directory identifier.

8. The method of claim 1, wherein the file system comprises a plurality of virtual extended attributes indicating a physical location of a plurality of files in the file system.

9. A non-transitory computer-readable storage medium comprising instructions that, when executed by a processing device, cause the processing device to:
identify a path name and a volume identifier of a file that is stored in a file system associated with a plurality of storage servers, the file being associated with a system call from a map/reduce-based application;
mounting the file system via a mount-point by using the volume identifier;
determine an extended attribute request by converting the system call from the map/reduce-based application to an executable routine to be used by the file system;
send, by the processing device, the extended attribute request to the mount-point, the extended attribute request comprising the path name to a server computer system to identify a physical location of the file at a storage server of the plurality of storage servers in the file system, wherein the file system comprises a virtual extended attribute that identifies the physical location of the file in view of a hash value associated with the path name in the request;
receive a response from the server computer system indicating the physical location of the file at the storage server in the file system in view of the hash value associated with the path name in the request, the received response comprising a directory name that is associated with the physical location of the file in the file system;
create a job request for the file in view of a closeness of the physical location of the file in the file system from the received response to a physical location of another storage server to operate on the file at the storage server in the file system in view of the job request; and
send the job request to a master storage server to combine results of an operation on the file with additional results associated with an additional job request.

10. The non-transitory computer-readable storage medium of claim 9, wherein to identify the path name, the processing device is further to:
receive the path name from the map/reduce-based application.

11. The non-transitory computer-readable storage medium of claim 9, wherein the response comprises a host identifier or a directory identifier.

12. A system comprising:
a memory; and
a first processing device, operatively coupled to the memory, to:
identify a path name and a volume identifier of a file that is stored in a file system associated with a plurality of storage servers, the file being associated with a system call from a map/reduce-based application;
mount the file system via a mount-point by using the volume identifier;
determine an extended attribute request by converting the system call from the map/reduce-based application to an executable routine to be used by the file system;
send the extended attribute request to the mount-point, the extended attribute request comprising the path name to a second processing device to identify a physical location of the file at a storage server of the plurality of storage servers in the file system, wherein the file system comprises a virtual extended attribute that identifies the physical location of the file in view of a hash value associated with the path name in the request;
receive a response from the second processing device indicating the physical location of the file at the storage server in the file system in view of the hash value associated with the path name in the request, the received response comprising a directory name that is associated with the physical location of the file in the file system;
create a job request for the file in view of a closeness of the physical location of the file in the file system from the received response to a physical location of another storage server to operate on the file at the storage server in the file system in view of the job request; and
send the job request to a master storage server to combine results of an operation on the file with additional results associated with an additional job request.

13. The system of claim 12, wherein to identify the path name, the processing device is further to:
receive the path name from the map/reduce-based application.

14. The system of claim 12, wherein the response comprises a host identifier or a directory identifier.

15. The system of claim 12, wherein the second processing device is to:
receive the extended attribute request from the first processing device, wherein the extended attribute request indicates the path name of the file;
read a value of an extended attribute of the file that corresponds to the path name, wherein the value of the extended attribute indicates the physical location of the file; and
send the response indicating the physical location of the file to the first processing device.

* * * * *